3,261,795
PROCESS FOR THE MANUFACTURE OF STABLE AMINO RESIN SOLUTIONS
Rudolf Goullon and Kurt Rehnelt, Dusseldorf-Holthausen, Germany, assignors to Böhme Fettchemie G.m.b.H., Dusseldorf, Germany
No Drawing. Filed Jan. 29, 1964, Ser. No. 341,119
Claims priority, application Germany, Feb. 2, 1963, B 70,594
4 Claims. (Cl. 260—29.4)

The invention relates to the manufacture of stable solutions of amino resins which do not exhibit precipitation of monomeric and oligomeric ingredients. More particularly, it relates to solutions wherein the stabilizer used is itself a synthetic resin.

Melamine-urea-formaldehyde copolymers, obtained by condensation in an alkaline medium, and having a relatively high urea content (e.g., 5 mols urea per mol melamine), frequently exhibit undesirable precipitation after condensation to higher concentrations. These precipitates are monomers and oligomers which are greatly influenced by the concentration, i.e., they may remain dissolved in a dilute solution, but precipitate in more concentrated solutions, in proportion to the concentration. The same phenomenon can be observed in pure melamine-formaldehyde resins having a fairly high content of monomers, and generally in amino resins of all kinds.

Such resin solutions are prone to produce faulty end products upon fabrication, e.g., when films are produced therefrom. These faults are manifested by turbidity and gelling which are favored by the influence of low temperatures.

It is known that melamine resins in solution can be stabilized by the addition of certain compounds, such as hexamethylene tetramine or dioxane. However, these materials are alien to melamine-formaldehyde or urea-melamine-formaldehyde resins and do not participate in the final setting of the resin to the infusible and insoluble stage, known to the expert as the "C-stage," but remain therein as foreign susbtances.

It has now been found that stable solutions of urea-melamine-formaldehyde solutions can be produced which do not exhibit separation of monomers and oligomers even upon prolonged storage. This is accomplished by adding to these solutions urea-formaldehyde resins which had been concentrated under mild conditions and had been produced as alkoxylated and then etherified urea-formaldehyde resins of given composition, as set forth in our co-pending application Serial Number 321,400, filed November 5, 1963.

Therein, the production of water clear urea-formaldehyde resins has been disclosed, carried out without the need for isolation of intermediary product and in a single reactor. This is effected by condensing 2 to 3 mols urea with substantially 9 to 10 mols formaldehyde in the presence of sodium borotetrafluoride at a pH of 8 to 9 for 2–6 hours at substantially 80° C., followed by alkoxylation of the condensate at 60° C. for 1 to 3 hours in an inert atmosphere, and ensuing etherification of the addition product with a low-molecular aliphatic alcohol. As alkoxylating agent, ethylene oxide preferably is employed which, however, may be replaced totally or in part by propylene oxide, 0.4 to 0.8 mols being used per mol urea. Suitable alcohols for the etherification are methanol, ethanol, n-propanol and isopropanol, methanol being the preferred embodiment. Approximately 0.5 to 1 mol alcohol are applied per mol urea. After addition of the alcohol, the mixture is agitated for approximately 30 minutes at approximately 80° C. in an acidic pH range of 6–6.5, to effect etherification. Especially good products are obtained when approximately ⅓ to ⅕ of the formaldehyde initially are withheld and added in a postcondensation after etherification.

The invention now will be further explained by the following examples. However, it should be understood that these are given merely by way of illustration, not of limitation, and that numerous changes may be made in the details without departing from the spirit and the scope of the invention as hereinafter claimed.

EXAMPLE 1

*a. Production of a copolymer*

1 mol melamine, 5 mols urea, 12.8 mols formaldehyde were copolymerized at approximately 90–98° C., with precondensation of the urea, at a pH of approximately 9, until 1 part reaction solution showed turbidity when mixed with 10 parts distilled water. The reaction then was stopped by lowering the temperature. The condensate was concentrated to 55–65 percent in vacuo. After standing for a prolonged time at room temperature or at temperatures of 0° C. and below, monomers precipitated causing turbidity of the condensate.

*b. Production of a stabilizer*

Any one of the resins was used which had been manufactured according to our co-pending application 321,400, and described hereinabove, or a mixture of condensates as described therein. The products thus obtained were concentrated in vacuo under mild conditions to a syrupy concentration at temperatures below 40° C. until a solids content (non-volatile) of approximately 80 percent had been attained.

*c. Stabilization*

To 100 parts by weight of a condensate as described under (a), 10 part of a stabilizer described in (b) and 2 parts water were added. The mixture thus produced, exposed to temperatures of 0–5° C. for 5 days, did not become turbid.

EXAMPLE 2

100 parts by weight of the copolymer described in 1(a) were mixed with 5 parts of an ethoxylated and etherified urea-formaldehyde resin according to 1(b). Under the conditions as named in 1(c) the mixture remained stable and did not become turbid.

EXAMPLE 3

This example shows the influence of a stabilizer as per Example 1(b) on the copolymer described in Example 1(a). The monomer precipitation was measured by extinction in a nephelometer. The values obtained are shown in Tables 1 and 2. In Table 1, the temperatures of the cold test (0–5° C.), and in Table 2, a temperature of 25° C. was employed.

TABLE 1

| Test No. | Product | Nephelometer Extinction at 0–5° C. after— | |
|---|---|---|---|
| | | 5 days | 10 days |
| 1 | Condensate according to Example 1 (a), No additive. | 0.15 | 0.25 |
| 2 | Condensate according to Example 1(a), plus 1% stabilizer according to Example 1(b). | 0.09 | 0.18 |
| 3 | Condensate according to Example 1 (a) plus 5% stabilizer according to Example 1(b). | 0.03 | 0.04 |
| 4 | Condensate according to Example 1 (a) plus 10% stabilizer according to Example 1(b). | 0.02 | 0.03 |

TABLE 2

| Test No. | Product | Nephelometer Extinction at 25° C. after— | |
|---|---|---|---|
| | | 10 days | 20 days |
| 1 | Condensate according to Example 1 (a), no additive. | 0.05 | 0.17 |
| 2 | Condensate according to Example 1 (a) plus 1% stabilizer according to Example 1(b). | 0.04 | 0.14 |
| 3 | Condensate according to Example 1 (a) plus 5% stabilizer according to Example 1(b). | 0.03 | 0.10 |
| 4 | Condensate according to Example 1 (a) plus 10% stabilizer according to Example 1(b). | 0.02 | 0.04 |

The stabilizing resin in Tables 1 and 2 had been produced, in the manner described above, by condensation of 9.7 mols formaldehyde with 2.6 mols urea, ethoxylated (approximately 0.4 mols) and etherified with 1.7 mols methanol.

EXAMPLE 4

1 mol melamine and 2.7 mols formaldehyde (in 30% solution) were condensed at 60–90° C. in an alkaline range, until 1 ml. of the 50% condensate solution became cloudy upon addition of 1 ml. water. The reaction then was stopped by cooling, and the product thus obtained spray-dried. To a 50% aqueous solution of the spray-dried condensate 1, 5 and 10% by weight, respectively, of a stabilizer as described in Example 1(b) were added. After 5 days at 20° C., these mixtures had turbidity values (extinction) and relative flow viscosities (flow times) as shown in Table 3.

TABLE 3

| Test No. | Product | Extinction | Rel. Flow Viscosity |
|---|---|---|---|
| 1 | Oligomeric melamine resin, no additive. | 0.14 | 10.85 |
| 2 | Same resin, 1% stabilizer | 0.12 | 8.39 |
| 3 | Same resin, 5% stabilizer | 0.09 | 5.23 |
| 4 | Same resin, 10% stabilizer | 0.05 | 4.23 |
| 5 | Distilled water (for comparison) | 0.00 | 1.00 |

Simultaneously, the tendency of the resin toward gelling was inhibited by the addition of the stabilizer.

EXAMPLE 5

A monomeric precondensate mixture, obtained by quick condensation in macroscopically glassy form after drying, consisted of a mixture of melamine- and methylolmelamine-formaldehyde, as follows:

| | Percent |
|---|---|
| Melamine | 12.0 |
| Monomethylolmelamine | 18.0 |
| Dimethylolmelamine | 23.0 |
| Trimethylolmelamine | 13.0 |
| Tetramethylolmelamine | 14.0 |
| Pentamethylolmelamine | 13.0 |
| Hexamethylolmelamine | 7.0 |

(Separated by paper chromatography according to Mh. Chem. 86, 653 (1955) and estimated by gravimetric area integration.)

To this precondensate mixture, in 15% by weight aqueous solution, 1 and 5 percent by weight, respectively, of a stabilizer were added. This stabilizer was a resin mixture as in Example 1(b). The mixture consisted of equal weight parts of 5 different resins, corresponding to Examples 1–5 of our co-pending application 321,400, each of these resins having the characteristics given in Table 4:

TABLE 4

| Resin No. | Mols urea | Mols CH$_2$O | Mols ethylene oxide | Mols McOH |
|---|---|---|---|---|
| 1 | 2.6 | 9.7 | 1 | 1.7 |
| 2 | 2.6 | 9.7 | 2 | 1.7 |
| 3 | 2.0 | 9.7 | 1 | 1.7 |
| 4 | 3.0 | 9.7 | 1 | 1.7 |
| 5 | 2.6 | 9.7 | 1 | 3.4 |

The turbidity of the precondensate mixture thus stabilized is shown by the extinction values in Table 5.

TABLE 5

| Test No. | Product | Extinction after 15 days at 20° C. |
|---|---|---|
| 1 | Monomer mixture, no additive | >2.0 |
| 2 | Same with 1% stabilizer | 0.18 |
| 3 | Same with 5% stabilizer | 0.00 |
| 4 | Pure water (for comparison) | 0.00 |

EXAMPLE 6

Monomer solutions according to Example 5 were stabilized as per Example 1(b) without, however, spray-drying them first. The turbidities and viscosities are shown in Table 6. Viscosities were measured in a torsion viscosimeter.

TABLE 6

| Test No. | Product | Extinction | Viscosity (cp.) |
|---|---|---|---|
| | | (48 hrs. at 20° C.) | |
| 1 | Monomer solution, no additives. | 0.26 | 240 |
| 2 | Same, 1% stabilizer | 0.17 | 190 |
| 3 | Same, 5% stabilizer | 0.11 | 135 |
| 4 | Same, 10% stabilizer | 0.07 | 70 |

EXAMPLE 7

An aqueous condensate solution according to Example 4 was used, which, however, had been condensed until 1.0 ml. condensate solution became cloudy upon addition of 0.5 ml. distilled water, was stabilized with a condensate produced by condensation of 2.6 mols urea with 9.7 mols formaldehyde, propoxylated (approximately 0.9 mol) and etherified with 1.7 mols methanol. The stabilized solution was subjected to a cold test (temperatures of 0–5° C.) for 5 days. The effect of stabilization is shown in Table 7. The viscosities, measured in centipoises, were ascertained in a Brookfield viscosimeter, spindle 7/20.

TABLE 7

| Test No. | Product | Brookfield units | Cp. |
|---|---|---|---|
| 1 | Condensate solution | 56 | 22,400 |
| 2 | Same, 1% stabilizer | 52 | 20,800 |
| 3 | Same, 5% stabilizer | 37 | 14,800 |
| 4 | Same, 10% stabilizer | 18 | 7,200 |

Whereas in the above examples a number of specific stabilizers have been employed, it should be noted that all variations of these stabilizers as described above and in our co-pending application Serial Number 321,400 give corresponding results.

Moreover, while solely urea-melamine-formaldehyde and melamine-formaldehyde condensates have been employed in the foregoing examples, the stabilizers named have the same wholesome effect on other aqueous amino resin solutions.

Such resin solutions are all known aminotriazines which also may be alkyl-, aryl-, aralkyl- and alkaryl-substituted, and furthermore aminodiazine resin solutions. Moreover, in lieu of melamine, corresponding products such as dicyandiamide and dicyandiamidine, and, in lieu of urea, thiourea, guanidine and its substituted products may be employed and are equally well stabilized by the process according to the invention.

The resins thus stabilized can be used for all purposes commonly associated with these resins whereby they are distinguished by their excellent storability. The resins are generally used for impregnations, especially of textiles, paper, paperboard, and wood, and for other applications, and are fabricated as usual.

We claim as our invention:

1. A process for the production of aqueous amino resin condensate solutions, stable upon prolonged storage and exposure to temperatures down to 0° C. against monomer and oligomer precipitation, which comprises incorporating in said solutions substantially 0.5 to 10 percent my weight, calculated on said condensate, of a resin obtained by the condensation of 2–3 mols urea with substantially 9–10 mols formaldehyde followed by alkoxylation of the reaction product with 0.4 to 0.8 mols, per mol urea, of a substance selected from the group consisting of ethylene oxide, propylene oxide, and mixtures thereof, and etherification with substantially 0.5 to 1 mol, per mol urea, of an alcohol selected from the group consisting of methanol, ethanol, n-propanol and isopropanol.

2. A process for the production of aqueous amino resin condensate solutions, stable upon prolonged storage and exposure to temperatures down to 0° C. against monomer and oligomer precipitation, which comprises stabilizing said solutions by incorporating therein substantially 0.5–10 weight percent, calculated on said condensate, of an agent consisting of a resin obtained by the condensation of 2–3 mols urea with substantially ⅔ to ⅘ of the total quantity of 9–10 mols formaldehyde followed by alkoxylation of the reaction product with 0.4–0.8 mols, per mol urea, of a substance selected from the group consisting of ethylene oxide, propylene oxide, and mixtures thereof, and etherification with 0.5–1 mol, per mol urea, of an alcohol selected from the group consisting of methanol, ethanol, n-propanol and isopropanol, followed by a postcondensation with the remaining ⅓ to ⅕ of the total quantity of formaldehyde.

3. Aqueous resin condensate solutions which are stable against monomer and oligomer precipitation upon prolonged storage and exposure to temperatures down to 0° C., consisting of amino resin condensate solutions plus substantially 0.5 to 10 percent by weight, calculated on the condensate, of a resin obtained by the condensation of 2–3 mols urea with substantially 9–10 mols of formaldehyde, followed by alkoxylation with 0.4 to 0.8 mols of a substance selected from the group consisting of ethylene oxide, propylene oxide, and mixtures thereof, followed by etherification with 0.5 to 1 mol, per mol of an alcohol selected from the group consisting of methanol, ethanol, n-propanol and isopropanol.

4. Aqueous resin condensate solutions which are stable against monomer and oligomer precipitation upon prolonged storage and exposure to temperatures down to 0° C., consisting of amino resin condensate solutions plus substantially 0.5–10 weight percent, calculated on the condensate, of a resin obtained by the condensation of 2–3 mols urea with substantially ⅔ to ⅘ of the total quantity of 9–10 mols formaldehyde, followed by alkoxylation with 0.4–0.8 mols of a substance selected from the group consisting of ethylene oxide, propylene oxide, and mixtures thereof, and etherification with 0.5–1 mol, per mol urea, of an alcohol selected from the group consisting of methanol, ethanol, n-propanol and isopropanol, and postcondensation with the remaining ⅓ to ⅕ of the total quantity of formaldehyde.

References Cited by the Examiner

UNITED STATES PATENTS

| | | | |
|---|---|---|---|
| 2,407,376 | 9/1946 | Maxwell | 260—849 |
| 2,769,798 | 11/1956 | Meis et al. | 260—70 |
| 2,915,502 | 12/1959 | Albrecht | 260—70 |

MURRAY TILLMAN, *Primary Examiner.*

J. C. BLEUTGE, *Assistant Examiner.*